United States Patent [19]

Hogan

[11] 4,218,230
[45] Aug. 19, 1980

[54] METHOD OF GLASS STRENGTHENING BY ION EXCHANGE

[75] Inventor: Patrick M. Hogan, DuBois, Pa.

[73] Assignee: Brockway Glass Company, Inc., Brockway, Pa.

[21] Appl. No.: 930,938

[22] Filed: Aug. 4, 1978

[51] Int. Cl.² .................. C03C 17/22; C03C 21/00
[52] U.S. Cl. ............................................ 65/30 E
[58] Field of Search ......................... 65/30 E, 60 R

[56] References Cited

U.S. PATENT DOCUMENTS

| 3,218,220 | 11/1965 | Weber | 65/30 E X |
|---|---|---|---|
| 3,287,201 | 11/1966 | Chisholm et al. | 65/30 E X |
| 3,473,906 | 10/1969 | Graham | 65/30 E |
| 3,607,172 | 9/1971 | Poole et al. | 65/30 E |
| 3,743,491 | 7/1973 | Poole et al. | 65/30 E |
| 3,791,809 | 2/1974 | Lau | 63/30 E |
| 3,798,013 | 3/1974 | Inoue et al. | 65/30 E |
| 3,844,754 | 10/1974 | Grubb et al. | 65/30 E X |
| 4,017,289 | 4/1977 | Hoda | 65/30 E X |
| 4,055,703 | 10/1977 | Rinehart | 65/30 E X |
| 4,133,665 | 1/1979 | Bartholomew et al. | 65/30 E |

FOREIGN PATENT DOCUMENTS

| 49-22467 | of 1974 | Japan | 65/30 E |
| 966734 | 8/1964 | United Kingdom | 65/30 E |

OTHER PUBLICATIONS

Rothermel, "Effect of Stress on Durability of Ion-Exchanged Surfaces", Journal of American Ceramic Society, vol. 50, pp. 574–577, 1967.

Primary Examiner—Richard V. Fisher
Attorney, Agent, or Firm—Christel, Bean & Linihan

[57] ABSTRACT

A method for strengthening a sodium lime silicate type glass body by substituting potassium ions for sodium ions in a surface layer of glass by spraying an aqueous solution of potassium ions and from 1 to 6 weight percent of sodium ions upon the glass at a temperature of from about 200° C. to just below the annealing point of the glass.

5 Claims, 2 Drawing Figures

METHOD OF GLASS STRENGTHENING BY ION EXCHANGE

BACKGROUND OF THE INVENTION

(a) Field of the Invention

This invention relates to a method of increasing the mechanical strength of glass articles by chemical tempering.

Present methods of tempering glass articles to increase the breaking strength consist in providing a surface layer of glass which is in compression since glass always fails in tension and fractures generally originate at the surface of the glass. Tempering the glass by establishing a compressive stress in the surface layer strengthens the glass in accordance with the degree of the compressive stress. This is due to the fact that a tensile stress will not be established at the surface layer until a sufficient strain is applied to first overcome the compressive stress.

The best known method of strengthening glass articles by establishing a surface compressive stress is by thermal tempering wherein the glass is cooled at a controlled rate, relatively rapidly, down through its strain point. In such cooling, the surface layer passes below the strain point of the glass and thus solidifies before the interior thereof so that the subsequent cooling of the interior of the glass with its consequent shrinking establishes a compressive stress at the outer surface of the glass.

Various other methods of establishing a compressive layer at the surface of the glass article have been proposed, such methods have been disclosed in U.S. Pat. Nos. 3,607,172; 3,218,220; 3,743,491 and 3,473,906.

In the methods disclosed in the foregoing patents, potassium ions are substituted for sodium ions at the surface layer of the glass and since the potassium ions are of larger atomic diameter, the surface layer is thus placed under compression.

Various methods are disclosed in the above patents for accomplishing the exchange of potassium ions for sodium ions. The glass, for example, may be immersed in a molten potassium salt bath or an aqueous solution of a potassium salt such as dipotassium phosphate may be applied to the glass surface.

While the foregoing prior art methods for chemically strengthening glass by ion exchange are effective, the time required to obtain the ion exchange is unacceptably long for high speed commercial production lines or the process is dangerous and difficult to manage as when molten alkali metal salts are used.

Furthermore, the prior art methods did not result in a glass strengthening which was as large and as uniform as is desirable. For example, when a solution of tripotassium phosphate is sprayed upon the glass, a uniform, continuous film of tripotassium phosphate does not form on the surface which results in areas which are not in contact with the potassium salt. As a result, a non-uniform chemical reaction of the salt with the glass produces an irregular pitted glass surface which is undesirable.

It has been previously shown that the presence of even a small amount of sodium salt, i.e., less than about 5 percent in a potassium salt melt can drastically reduce the amount of exchange of potassium ions for the sodium ions in the surface of the glass. Such results are clearly set forth in an article by Hale, Nature 217 (3) pages 1115–18, 1968, these results were confirmed by Rothermel in an article appearing in the Journal of the American Ceramic Society, Volume 50, pages 574–7, 1967.

BRIEF DESCRIPTION OF THE INVENTION

It has now been unexpectedly discovered that the addition of the small amount, i.e., from about 1 to about 6 weight percent of sodium ion into an aqueous solution containing potassium ions for treating glass surfaces, contrary to what might be expected from the teachings of Hale and Rothermel, who used a melt rather than a solution, actually not only increases the rate of the exchange of sodium ions contained in glass for potassium ions, but also unexpectedly increases the percentage of sodium ions replaced by potassium ions.

The invention therefore comprises a method for strengthening a glass body by substituting potassium ions for sodium ions in the surface layer of the glass to produce a compressive glass layer by spraying an aqueous solution of potassium ions upon the glass at a temperature of from about 200° C. to below the annealing point of the glass wherein the solution comprises, in addition to potassium ions, from about 1 to about 6 weight percent of sodium ion.

DETAILED DESCRIPTION OF THE INVENTION

The glass to be strengthened in accordance with this invention, is a sodium lime silicate type glass usually prepared by fusing sodium carbonate with silica to obtain glass and carbon dioxide or by fusing sodium sulfate and silica to form glass and the sulphur trioxide. The glass is usually a complex mixture of silicas, at least some of which is sodium silicate.

The aqueous solution is generally an aqueous solution containing at least 10 percent and preferably from about 20 to about 55 weight percent of tripotassium or dipotassium phosphate to provide at least 5 and preferably from about 12 to about 30 weight percent potassium ion. The preferred potassium salt is tripotassium phosphate.

In accordance with the method, the solution, preferably containing about 50 weight percent of tripotassium phosphate, is sprayed on the glass while it is in a heated condition so that the water flashes off leaving the potassium salt deposited on the hot glass surface.

The solution also contains from about 1 to about 6 weight percent of sodium ion which may be provided by any suitable sodium salt or base such as trisodium phosphate, disodium phosphate, sodium gluconate, sodium nitrate and mixtures thereof. When trisodium phosphate is used as the sodium ion provider, it may be present in the solution in a concentration ranging from about 4 to about 13 weight percent.

The solution is sprayed upon the glass at a temperature of from about 200° C. to just below the annealing point of the glass, eg., about 550° C. and desirably followed by holding the glass at from about 300° C. to just below the annealing point for from about 5 to about 30 minutes.

The following examples are for the purpose of illustrating, not limiting, the method of the invention. Unless otherwise indicated, all parts and percentages are by weight.

EXAMPLE 1

Ten percent by weight of trisodium phosphate (4.2 weight percent based upon sodium) is added to an aqueous solution containing about 50 weight percent tripotassium phosphate (about 27 percent potassium by weight). The aqueous spray is then applied to a sodium silicate glass surface at a temperature of about 225° C. which causes the water in the solution to flash from the surface leaving a contiguous coating of a mixture of trisodium phosphate ($Na_3PO_4$) and tripotassium phosphates ($K_3PO_4$) upon the surface. The coating is retained upon the surface at a temperature of about 525° C. for about 15 minutes.

Figure 1:
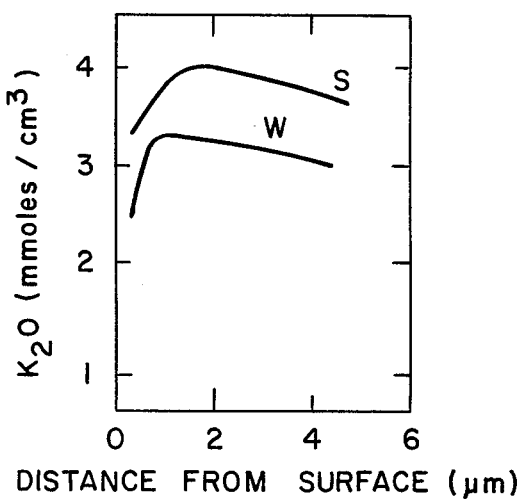
FIG. 1 is a graph of potassium oxide ($K_2O$) concentration in glass against distances from the glass surface when $K_3PO_4$ solution is used alone and when used with $Na_3PO_4$.

Excess sodium and potassium salts are then rinsed from the surface and the surface is tested for the presence of potassium in the surface. Curve S in FIG. 1 illustrates the number of millimoles per cubic centimeter of potassium oxide ($K_2O$) found at varying distances from the surface.

EXAMPLE 2

Example 1 is repeated except that sodium phosphate is not incorporated into the solution. Curve W of FIG. 1 illustrates the number of millimoles per cubic centimeter of potassium oxide ($K_2O$) found at varying distances from the surface. A comparison of the amount of potassium found when sodium was incorporated into the solution, as illustrated in FIG. 1, is clearly substantially more than the amount of potassium found when potassium phosphate is used alone.

EXAMPLE 3

Figure 2:
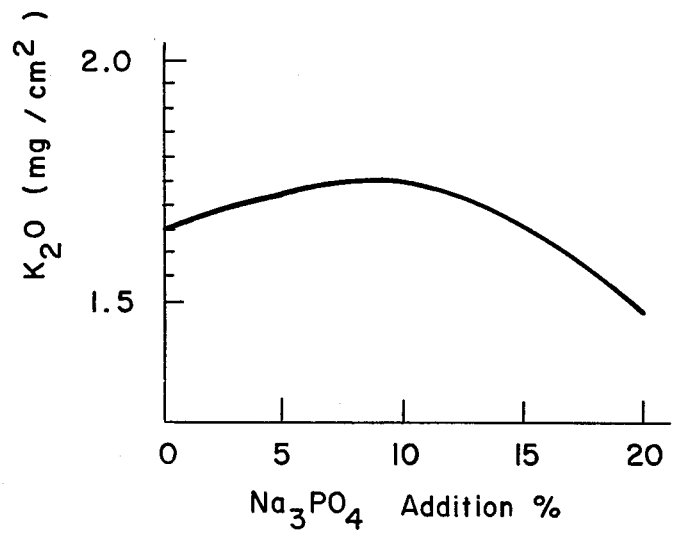
FIG. 2 is a graph of $K_2O$ concentration at the glass surface against the percentage of $Na_3PO_4$ used in the treating solution.

Example 1 is repeated except varying percentages of sodium phosphate are added to the solution prior to treating the glass surface with the solution. The results are indicated in FIG. 2 which shows that a substantially larger potassium content is found when a sodium phosphate concentration is used which is from above 0 to below about 15 weight percent of the solution (0 to about 6 percent sodium) and a dramatic improvement in potassium exchange is noted between about 5 and about 12 percent sodium phosphate (2 to about 5 weight percent sodium ion) addition to the solution. In all cases, the glass surface was treated with the solution at 525° C. for 15 minutes. In all cases, where sodium phosphate addition was used, etching of the glass surface by the salts in the solution was reduced and at additions of greater than about 2 weight percent trisodium phosphate addition, no etching or pitting of the surface was observed.

The foregoing examples clearly illustrate the method of the invention which permits larger quantities of potassium ion to be exchanged for sodium ion in the surface of sodium silicate type glass than is obtainable when prior art ion exchange solutions are used which do not contain sodium ion in conjunction with potassium ion in the treating solution.

The examples further illustrate the preparation of a high strength sodium lime silicate type glass having above about 3.4 and desirably above about 3.6 millimoles per cubic centimeter of potassium oxide at a distance of one $\mu$m from the surface of the glass.

What is claimed is:

1. A single stage method of strengthening soda-lime-silicate glass articles by substituting potassium ions for sodium ions in the surface layer of the glass to produce a compressive layer, said method comprising spraying an aqueous exchange solution consisting essentially of at least 5% by weight potassium ions, from about 1 to about 6 weight percent of sodium ions and water to form a coating upon the glass at a temperature from about 200° C. to just below the annealing point of the glass, maintaining said glass at a temperature below the annealing point for a time sufficient to cause ion exchange to occur, and cooling to room temperature, whereby sodium ions are evenly and quickly replaced by potassium ions beneath the surface of the glass with reduced pitting or etching of the glass surface.

2. The method of claim 1 wherein the glass is heat treated at a temperature from about 300° C. to just below the annealing point for from about 5 to 30 minutes while in contact with a coating deposited from said aqueous solution, wherein the aqueous solution contains from about 12 to about 30 weight percent of potassium ion and from about 2 to about 5 weight percent of sodium ion.

3. The method of claim 2 wherein the aqueous solution contains from about 20 to about 55 weight percent of tripotassium phosphate, and from about 4 to about 13 weight percent of trisodium phosphate.

4. The method of claim 2 wherein the sodium ion is provided by sodium gluconate.

5. The method of claim 2 wherein the sodium is selected from the group of compounds consisting of trisodium phosphate, disodium phosphate, sodium gluconate, sodium nitrate and mixtures thereof.

* * * * *